United States Patent Office 3,393,231
Patented July 16, 1968

3,393,231
PREPARATION OF NORBORNANE ESTERS AND POLYHYDRIC ALCOHOLS
Jan W. H. Faber, Rochester, N.Y., assignor to Eastman Kodak Company, Rochester, N.Y., a corporation of New Jersey
No Drawing. Filed Apr. 27, 1965, Ser. No. 451,303
5 Claims. (Cl. 260—489)

This invention relates to the preparation of norbornane compounds, and in one aspect to the preparation of polyhydroxynorbornanes. It also relates to the preparation of esters of polyhydroxynorbornanes, and to a method of converting such esters to the corresponding alcohols.

The term "norbornane" as employed herein refers to a 1,4-methylene bridged, saturated, carbocyclic, 6-membered ring, also referred to in the literature as bicyclo [2.2.1]heptane or norcamphane.

Polyhydroxynorbornanes are particularly useful as plasticizers for gelatin containing coatings in that such coatings may be applied to flexible supports and stored at low relative humidity without curling. However, no good method has been disclosed in the literature for preparing such alcohols on a commercial scale. Previously, it had been suggested that 2,5- and 2,6-norbornanediols could be prepared by reacting acetic anhydride and acetic acid with bicyclo[2.2.1]hept-5-ene-2-ol acetate in the presence of perchloric acid catalyst to form the diacetates, and converting the latter to the diols by reaction with sodium methylate in anhydrous methanol followed by neutralization with glacial acetic acid. One disadvantage of such a process is that undesirable amounts of inorganic salts are obtained along with the norbornanediols. Furthermore, such a process cannot easily be adapted to a continuous method for preparing these diols. It, therefore, appeared desirable to provide an improved method for preparing esters of polyhydric alcohols containing norbornane nuclei and an improved method of converting such esters to the corresponding polyhydric alcohols.

One object of this invention is to provide a novel method for the preparation of esters of polyhydric alcohols containing norbornane nuclei. Another object of this invention is to provide a novel method of preparing polyhydric alcohols containing norbornane nuclei from esters thereof which does not result in the formation of undesirable quantities of inorganic salt. A further object of this invention is to provide a continuous process for synthesizing polyhydric alcohols containing norbornane nuclei. Other objects of this invention will be apparent from this disclosure and the appended claims.

In one embodiment of this invention, diesters of norbornanediols are prepared by reacting bicyclo[2.2.1] heptadiene or bicyclo[2.2.1]hept-5-ene-2-ol acylate with a lower fatty acid, heating the mixture and catalyzing the reaction with an acidic ion exchange resin. Preferably, water is incorporated in the reaction mixture. The presence of water increases the yield of diester between 5 and 6 fold.

In another embodiment of this invention, lower fatty acid esters of polyhydric alcohols containing norbornane nuclei are transesterified by mixing therewith an alcohol containing 1 to 4 carbon atoms, heating the mixture and catalyzing the transesterification with the gas of a strong acid. The process of transesterifying in accordance with this embodiment of the invention does not result in the formation of large quantities of inorganic salt, and alcohols containing norbornane nuclei may be recovered from the reaction mixture economically.

The synthesis of diesters of norbornanediols, and the transesterification of esters of alcohols containing norbornane nuclei in accordance with this invention, may be carried out as a continuous process if desired.

Example 1 demonstrates a continuous process for preparing diesters of norbornanediols.

Example 1

A 2-foot column 1 inch in diameter was packed with an acidic ion exchange resin (Amberlite IR–120, Rohm and Haas) together with glass helices. Through this column was pumped a mixture of 2000 cc. (13 moles) of bicyclo[2.2.1]hept-2-ene-5-ol acetate, 1600 cc. (26.6 moles) of acetic acid and 200 cc. of water at a rate of 3.8 liters per hour. The excess starting materials, including water, were then distilled out of the reaction mixture. The product obtained consisted of 11 percent 2,5- and 2,6-norbornanediol isomers, 7% hydroxybicyclo[2.2.1] heptane-2-ol acetate isomers, and 76% norboranediol diacetate isomers to give a total yield of 94%.

The preparation of norbornanediols from the mixture of mono- and diacetates of norbornanediols formed in Example 1, by the transesterification method of this invention, is demonstrated in Example 2.

Example 2

Into a continuous reactor having an 8 foot cylindrical tube with an inside diameter of 35 mm., equipped with a steam jacket and inlet tubes at the top and the bottom of the tube, and filled with ½ inch ceramic saddles, were fed 2000 cc. of the mixture obtained in Example 1 mixed with 4000 cc. of anhydrous methanol. The mixture was pumped into the top of the reactor at the rate of 3.6 liters per hour and dry hydrogen chloride gas was injected into the reactor at the rate of 10 cc. per minute. A viscous liquid was collected at the bottom of the reactor and heated under vacuum for ten minutes. The diol crystallized upon cooling and gave a yield of 96%.

Examples 3 and 4 demonstrate the preparation of mono- and diesters of norbornanediols by a batch process in accordance with this invention.

Example 3

In a 5-liter flask equipped with a stirrer and reflux condenser were placed 1520 grams (10 moles) of bicyclo- (2.2.1]hept-2-ene-5-ol acetate, 1000 cc. of acetic acid, 200 cc. of water, and 152 grams of the acid ion exchange resin Amberlite IR–120 (H+ form). The mixture was refluxed with stirring for 16 hours. At this time the conversion was 95%. The reaction product consisted of approximately 56% of norbornanediol diacetates, 36% of norbornanediol monoacetates and 3–5% of norbornanediol isomers. This mixture was converted to norbornanediols in a continuous reactor in the same manner as described in Example 2.

Example 4

In a 5-liter flask equipped with a stirrer, reflux condenser and thermometer were placed a mixture of 920 grams (10 moles) of bicyclo[2.2.1]heptadiene, 2000 cc. of acetic acid, 200 cc. of water, and 184 grams of the acidic ion exchange resin Amberlite IR–120. The reaction mixture was refluxed with stirring for 24 hours. At this point, gas chromatography indicated the absence of bicyclo[2.2.1]heptadiene. A small amount of low-boiling material was present. The reaction mixture represented a 90–94% yield with the following products distribution: 63% norbornanediol diacetates, 23% norbornanediol monoacetates and 14% norbornanediols.

Example 5 illustrates a method for transesterifying mono- and diesters of norbornanediols in a batch process in accordance with the invention.

Example 5

In a 5-liter flask equipped with a stirrer, reflux condenser and a gas inlet tube were placed 1175 cc. (5.54 moles) of norbornanediol diacetates and 2000 cc. of dry methanol and the mixture was refluxed, with stirring, while one liter of dry gaseous hydrogen chloride was added over a period of one hour. Refluxing was then continued for 16 hours after which the flask was connected to a rotating evaporator and all volatile materials were removed with heating. The very viscous residue, which slowly crystallized upon cooling, was dissolved in two liters of hot water, and the resulting solution was cooled, washed once with one liter of methylene chloride, treated with decolorizing carbon, and filtered.

The refractive index of the water-white, odorless solution was 1.3985 indicating a 35% solution. This corresponds with a yield of 700 grams or 98%.

In the preparation of esters of norbornanediols in accordance with this invention, the preferred starting materials are bicyclo[2.2.1]heptadiene or bicyclo[2.2.1]hept-5-ene-2-ol acylate wherein the acyl group contains from 1 to 4 carbon atoms. The monoester is the preferred starting material since bicyclo[2.2.1]heptadiene is rather toxic. These starting materials are reacted with lower fatty acids, that is, acids containing from 1 to 4 carbon atoms, by heating until lower fatty acid mono- and diesters of norbornanediol are formed. Typical useful acids include acetic, propionic, and butyric acids, and these acids may, if desired, be halogenated acids such as trichloroacetic acid.

The addition of lower fatty acid to the starting materials employed herein is catalyzed in accordance with the invention with a catalytic quantity of an acidic ion exchange resin. The preferred ion exchange resins employed herein are sulfonated resins, particularly sulfonated polystyrene resins. Especially useful are sulfonated polystyrene resins cross-linked with a divinyl benzene. Other useful resins include polystyrene cationic resins acidified with a group selected from the class consisting of sulfonic, phosphonic, carboxylic and phenolic groups, crosslinked with an agent selected from the class consisting of divinyl acetylene, divinyl benzene and methallyl chloride. The amount of crosslinking may vary over a wide range, such as from 1% to 50%. Some commercially available ion exchange resins which may be employed are: Amberlite IR-120, Amberlite IR-122 and Amberlite XE-100, all manufactured by Rohm and Haas; Catex 15 manufactured by Infilco Inc.; Dowex 50 manufactured by Dow Chemical Co.; Permutit Q manufactured by Pfaudler-Permutit and Duolite C-3 manufactured by Chemical Process Co.

If desired, mono- and diesters of norbornanediols may be prepared as described above in the absence of water. When no water is employed, the yield of esters is on the order of 10%–15%. However, by incorporating water in the reaction mixture an unexpectedly great increase in the yield is obtained, as demonstrated in the foregoing examples. The water may be employed in a concentration effective to produce an increased yield. Concentration of the starting bicyclo[2.2.1]heptadiene or bicyclo[2.2.1]hept-2-en-5-ol acylate to water in the range of 5:1 to 20:1 produces especially good yields.

The process of preparing esters by this invention is advantageously conducted at elevated temperatures, preferably from 50° C. up to reflux temperatures, refluxing the reactants being very satisfactory. Higher temperatures, such as up to 200° C., may be used in pressure systems.

Especially good results are obtained in preparing esters of alcohols containing norbornane nuclei by reacting from about one to two moles lower fatty acid with about one mole bicyclo[2.2.1]hept-2-ene-5-ol acylate, or reacting about two to three moles lower fatty acid with one mole bicyclo[2.2.1]heptadiene. The operable concentrations may, however, be varied over a wide range.

The esters of norbornanediols prepared as described above, which have been freed of water, or anhydrous lower fatty acid esters of any polyhydric alcohols containing norbornane nuclei may be transesterified in accordance with the process of this invention. The transesterification of this invention features an ester interchange between norbornanediol esters and an alcohol having 1 to 4 carbon atoms, such as methanol, ethanol, n-propanol, isopropanol, n-butanol or isobutanol. The mixture of ester and alcohol is heated at temperatures of over 50° C., preferably under reflux, and the gas of a strong acid, preferably a mineral acid, is passed into the reaction mixture. Especially suitable gases include hydrogen chloride, hydrogen bromide and boron trifluoride.

It is preferable that the transesterification be conducted under anhydrous conditions to obtain the most favorable reaction rate and optimum yield. Although traces of water may be tolerated, the presence of more than trace amounts inhibits the transesterification and reduces the yield.

The transesterification reaction of this invention is most advantageously conducted with an excess of alcohol over the ester, an excess of 1 to 3 parts by volume of alcohol per each part by volume of ester being especially satisfactory. The acid gas advantageously is introduced at a rate of 1 volume per each 4 to 8 volumes of reaction mixture (ester). The rate of introducing the ester in a continuous process depends on many variables, such as the diameter and length of the reaction column. Rates of 60 cc. ester per minute into a column 8 feet long with an inside diameter of 35 mm., with the simultaneous addition of 10 cc. HCl per minute, gives good results.

As noted above, the present method of preparing norbornanediols is especially advantageous in that it avoids formation of undesirable quantities of inorganic salt and features the use of a catalyst which is not used up in the reaction. The ion exchange resin catalyst used in the invention may be reused over long periods of time without requiring recharging.

The invention has been described in detail with particular reference to preferred embodiments thereof but it will be understood that variations and modifications can be effected within the spirit and scope of the invention as described hereinabove and as defined in the appended claims.

I claim:
1. The process of preparing norbornanediols which comprises feeding into a reaction zone:
  (a) a compound selected from the group consisting of bicyclo[2.2.1]heptadiene and bicyclo[2.2.1]hept-2-ene-5-ol acylate wherein the acyl group is derived from lower fatty acids having 1–4 carbon atoms,
  (b) a lower fatty acid, and
  (c) water in a concentration of 1:5 to 1:20 based on the weight of (a)
    maintaining in the reaction zone a catalytic quantity of an acidic ion exchange resin;
    heating the combination of (a), (b) and (c) in the reaction zone at a temperature of at least 50° C. until mono- and diesters of norbornanediols are formed;
    freeing said esters of norbornanediols from water and other volatile materials;
    mixing said esters of norbornanediols with an anhydrous alkanol having 1 to 4 carbon atoms;
    heating said mixture above 50° C. and continuously passing therein the gas of a strong acid, and recovering the norbornanediols.

2. The process of preparing lower fatty acid esters of norbornanediols which comprises mixing the following reactants:
  (a) a compound selected from the group consisting of bicyclo[2.2.1]heptadiene and bicyclo[2.2.1]hept-2-ene-5-ol acylate, wherein said acyl group is derived from lower fatty acids having 1 to 4 carbon atoms,
  (b) a lower fatty acid containing from 1 to 4 carbon atoms, and (c) water in a concentration of 1:5 to 1:20 based on the weight of reactant (a);

heating said reactants at a temperature of at least 50° C. to form norbornanediol acylates, and catalyzing the reactions with an acidic ion exchange resin.

3. The process of preparing acetic acid esters of norbornanediols which comprises refluxing 1.9 parts by weight acetic acid, 1 part by weight bicyclo[2.2.1]hept-2-ene-5-ol acylate wherein said acyl group is derived from lower fatty acids having 1–4 carbon atoms, about .2 part by weight water and .19 part by weight of a polystyrene cationic exchange resin acidified with a group selected from the class consisting of sulfonic, phosphonic, carboxylic and phenolic groups and crosslinked with an agent selected from the group consisting of divinyl acetylene, divinyl benzene and methylallyl chloride, and recovering the esterified norbornanediols.

4. A continuous process for the preparation of lower fatty acid esters of norbornanediols which comprises continuously feeding into a reaction zone the following reactants:

(a) a compound selected from the group consisting of bicyclo[2.2.1]heptadiene and bicyclo[2.2.1]hept-2-ene-5-ol acylate wherein, said acyl group is derived from lower fatty acids containing 1 to 4 carbon atoms, (b) a lower fatty acid containing from 1 to 4 carbon atoms, and (c) water in a concentration of 1:5 to 1:20 based on the weight of reactant (a);

maintaining in said reaction zone an acidic ion exchange resin as catalyst;

heating said reactants in said reaction zone at a temperature of at least 50° C.;

holding said reactants in said reaction zone for a time sufficient for said reactants (a) and (b) to form esters of norbornanediols;

continuously recovering esters of norbornanediols from said reaction zone.

5. The process of continuously preparing unesterified norbornanediols which comprises continuously forming lower fatty acid esters of norbornanediols in accordance with the process of claim 4, continuously feeding said esters into a reaction zone together with an alkanol containing 1 to 4 carbon atoms and the gas of a strong acid, heating the mixture of ester, alkanol and gas above 50° C. in the absence of water, and recovering norbornanediols.

References Cited
UNITED STATES PATENTS 2,063,162 12/1936 Henke et al. _____ 260—631.5
2,678,332 5/1954 Cottle.

OTHER REFERENCES

Heusler et al.: The Terpenes, 1902, pp. 147–148.
Sussman: Ind. and Eng. Chem., vol. 38 (1946), pp. 1228–1230.
Migrdichian: Organic Synthesis, 1957, p. 328.

LORRAINE A. WEINBERGER, *Primary Examiner.*
V. GARNER, *Assistant Examiner.*